(12) United States Patent
Isoda

(10) Patent No.: US 12,417,213 B2
(45) Date of Patent: Sep. 16, 2025

(54) COMPUTER SYSTEM AND SERVICE CONSTRUCTION SUPPORT METHOD

(71) Applicant: Hitachi, Ltd., Tokyo (JP)

(72) Inventor: Yuya Isoda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/780,602

(22) Filed: Jul. 23, 2024

(65) Prior Publication Data

US 2025/0068602 A1 Feb. 27, 2025

(51) Int. Cl.
*G06F 16/00* (2019.01)
*G06F 16/21* (2019.01)
*G06F 16/28* (2019.01)

(52) U.S. Cl.
CPC .......... *G06F 16/211* (2019.01); *G06F 16/285* (2019.01)

(58) Field of Classification Search
None
See application file for complete search history.

(56) References Cited

U.S. PATENT DOCUMENTS

| | | | | |
|---|---|---|---|---|
| 7,151,966 B1 * | 12/2006 | Baier | ...................... | H04L 67/51 |
| | | | | 700/19 |
| 10,944,641 B1 * | 3/2021 | Zacks | ................. | G06F 3/04847 |
| 2003/0172368 A1 * | 9/2003 | Alumbaugh | ............... | G06F 8/71 |
| | | | | 717/106 |
| 2016/0034305 A1 * | 2/2016 | Shear | ........................ | G06F 9/50 |
| | | | | 707/722 |
| 2018/0366221 A1 * | 12/2018 | Crehore | ................ | G06F 16/211 |
| 2021/0303584 A1 * | 9/2021 | Fan | .................... | G06F 16/2291 |
| 2022/0086279 A1 * | 3/2022 | Skinner | ............... | H04M 3/5232 |
| 2022/0342895 A1 | 10/2022 | Sasamoto et al. | | |
| 2022/0358135 A1 * | 11/2022 | Isoda | ..................... | G06F 16/213 |
| 2022/0407861 A1 * | 12/2022 | Beecham | ................ | H04L 63/20 |
| 2024/0111263 A1 * | 4/2024 | Namburi | .............. | G05B 19/042 |
| 2024/0248884 A1 * | 7/2024 | Hundt | ................... | G06F 16/211 |
| 2024/0291708 A1 * | 8/2024 | Panwar | .................. | G06F 16/26 |
| 2025/0068602 A1 * | 2/2025 | Isoda | .................... | G06F 16/211 |

FOREIGN PATENT DOCUMENTS

JP 2022-167673 A 11/2022

* cited by examiner

*Primary Examiner* — Hasanul Mobin
(74) *Attorney, Agent, or Firm* — Volpe Koenig

(57) ABSTRACT

A computer system connects with a base that provides a service including a plurality of components, retains component management information for managing schemas associated with the components included in the service, at the time of reception of a retrieval request for retrieving the components to achieve a service using a target component, retrieves associated components having the same schema as the target component with reference to the component management information, while designating the schema of the target component as a starting point, and presents the associated components.

10 Claims, 19 Drawing Sheets

FIG. 3A

```
{                                      ~130
    "project": "Project A",
    "owner": "USER A",
    "component": [
        ...
    ]
}
```

FIG. 3B

```
{
    "component_id": 1,
    "name": "FHIR-Storage-A",
    "type": "storage",
    "template": {
        "project": "public",
        "component_type": "storage",
        "component_name": "FHIR-Storage",
        "template_name": "fhir_storage_template"
    },
    "service": {
        "service": "running",
        "release": "private",
        "location": "Client A",
        "access": [
            "input",
            "output",
            "db_connection"
        ],
        "cost_per_row": 0.0002
    },
    "requirement": {}
},
```

FIG. 3C

```
{
    "schema_id": 2,
    "name": "FHIR-Schema-A",
    "type": "schema",
    "template": {
        "project": "public",
        "component_type": "schema",
        "schema_name": "FHIR-Schema",
        "template_name": "fhir_schema_template"
    },
    "service": {
        "service": "running",
        "release": "private",
        "location": "Client A",
        "access": [
            "input",
            "output",
            "db_connection"
        ],
        "target_id": [1]
    },
    "requirement": {}
},
```

FIG. 3D

```
{
    "schema_id": 3,
    "name": "FHIR-Schema-A-Input",
    "type": "schema",
    "template": {
        "project": "public",
        "component_type": "schema",
        "schema_name": "FHIR-Schema",
        "template_name": "fhir_schema_template"
    },
    "service": {
        "service": "stop",
        "release": "public",
        "access": [
            "input"
        ],
        "target_id": 1
    },
    "requirement": {}
},
```

```
{
    "schema_id": 4,
    "name": "FHIR-Schema-A-Output",
    "type": "schema",
    "template": {
        "project": "public",
        "component_type": "schema",
        "schema_name": "FHIR-Schema",
        "template_name": "fhir_schema_template"
    },
    "service": {
        "service": "stop",
        "release": "public",
        "access": [
            "output"
        ],
        "target_id": 1
    },
    "requirement": {}
}
```

FIG. 7

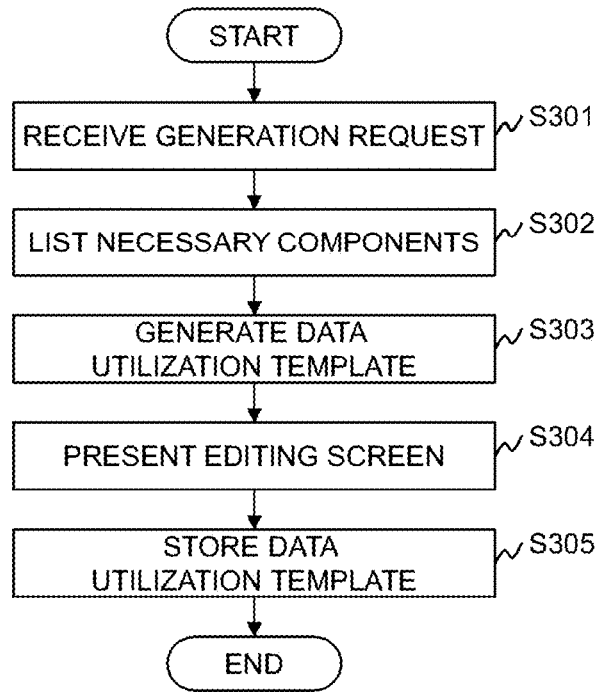

```
START
  ↓
RECEIVE GENERATION REQUEST  ~S301
  ↓
LIST NECESSARY COMPONENTS  ~S302
  ↓
GENERATE DATA
UTILIZATION TEMPLATE  ~S303
  ↓
PRESENT EDITING SCREEN  ~S304
  ↓
STORE DATA
UTILIZATION TEMPLATE  ~S305
  ↓
END
```

FIG. 8A

```
{
  "id": 1,
  "type": "data_utilization_template",
  "name": "TEST-1",
  "user": {
      "name": "USER A",
      "location": "Client A"
  },
  "registration_date": "2023-03-31 12:00:00",
  "execution_status": "created",
  "execution_mode": "synchronous_execution",
  "execution_request": [
  ],
  "execution_plan": [
  ],
  "execution_service": [
  ],
  "execution_history": [
  ],
  "execution_result": {
  },
  "application_request": {
  }
}
```
~800

FIG. 8B

```
"execution_request": [
  {
    "deployment": {
      "location": "Client A",
      "name": "FHIR-Storage-A"
    },
    "template": {
      "project": "public",
      "component_type": "storage",
      "component_name": "FHIR-Storage",
      "template_name": "fhir_storage_template"
    },
    "requirement": {}
  },
  {
    "deployment": {
      "location": "Client A",
      "name": "SS-MIX-Tool-A"
    },
    "template": {
      "project": "public",
      "component_type": "application",
      "component_name": "SS-MIX-Tool",
      "template_name": "ss_mix_tool_template"
    },
    "requirement": {}
  }
],
```

FIG. 8C

```
"execution_plan": [
  {
    "order_id": 0,
    "name": "FHIR-Storage-A",
    "template": {
       "project": "public",
       "component_type": "storage",
       "component_name": "FHIR-Storage",
       "template_name": "fhir_storage_template"
    },
    "service": {
       "release": "private",
       "location": "Client A",
       "access": [
          "output",
          "db_connection"
       ],
       "target_id": [1]
    },
    "lifetime": "keep"
  },
  {
    "order_id": 1,
    "name": "FHIR-Schema-A",
    "template": {
       "project": "public",
       "component_type": "schema",
       "component_name": "FHIR-Schema",
       "template_name": "fhir_schema_template"
    },
    "service": {
       "service": "running",
       "release": "private",
       "location": "Client A",
       "access": [
          "output",
          "db_connection"
       ],
       "target_id": [0, 4]
    },
    "lifetime": "keep"
  },
```

FIG. 8D

```
{
    "order_id": 2,
    "name": "SS-MIX-Storage-A",
    "template": {
        "project": "public",
        "component_type": "storage",
        "component_name": "SS-MIX-Storage",
        "template_name": "ss_mix_storage_temp"
    },
    "service": {
        "release": "private",
        "location": "Client A",
        "access": [
            "input",
            "output",
            "db_connection"
        ],
        "target_id": [3]
    },
    "lifetime": "end_of_data_utilization"
},
{
    "order_id": 3,
    "name": "SS-MIX-Schema-A",
    "template": {
        "project": "public",
        "component_type": "schema",
        "component_name": "SS-MIX-Schema",
        "template_name": "ss_mix_schema_temp"
    },
    "service": {
        "release": "private",
        "location": "Client A",
        "access": [
            "input",
            "output",
            "db_connection"
        ],
        "target_id": [4, 5]
    },
    "lifetime": "end_of_data_utilization"
},
```

FIG. 8E

```
{
    "order_id": 4,
    "name": "Data-Conversion-A",
    "template": {
        "project": "Project B",
        "component_type": "data_processing",
        "component_name": "Data-Conversion-B",
        "template_name": "data_conversion_template"
    },
    "service": {
        "release": "private",
        "location": "Client A",
        "access": [
            "input",
            "output"
        ],
        "target_id": [1, 3]
    },
    "data_transfer": [
        {
            "id": 1,
            "in_out": "input",
            "type": "pull",
            "target_id": [1]
        },
        {
            "id": 2,
            "in_out": "output",
            "type": "push",
            "target_id": [3]
        }
    ],
    "lifetime": "one_time"
},
```

FIG. 8F

```
{
    "order_id": 5,
    "name": "SS-MIX-Tool-A",
    "template": {
        "project": "public",
        "component_type": "application",
        "component_name": "SS-MIX-Tool",
        "template_name": "ss_mix_tool_template"
    },
    "service": {
        "release": "private",
        "location": "Client A",
        "access": [
            "input"
        ],
        "target_id": [3]
    },
    "lifetime": "end_of_data_utilization"
}
],
```

FIG. 8G

```
"execution_service": [
    {
        "order_id": 5,
        "name": "SS-MIX-Tool-A",
        "location": "Client A",
        "access": {
            "address": "https://localhost:8080",
            "user": "user",
            "password": "password"
        }
    }
],
```

FIG. 8H

```
"application_request": [
    {
        "user": {
            "location": "Client B",
            "name": "USER B"
        },
        "response": "Accept",
    }
],
```

FIG. 10A

```
"execution_history": [
  {
    "order_id": 0,
    "time": {
      "deployment": 0.0,
      "execution": 10.0,
      "removal": 0.0,
      "cost": 0
    },
    "data": {
      "output": {
        "rows": 12000,
        "volume": 12.0
      },
      "cost": 2.4
    }
  },
  {
    "order_id": 1,
    "time": {
      "deployment": 0.0,
      "execution": 10.0,
      "removal": 0.0,
      "cost": 0
    },
    "data": {
      "output": {
        "rows": 12000,
        "volume": 12.0
      },
      "cost": 0.0
    }
  },
```

FIG. 10B

```
{
    "order_id": 2,
    "time": {
        "deployment": 100.0,
        "execution": 1200.0,
        "removal": 40.0,
        "cost": 13.4
    },
    "data": {
        "input": {
            "rows": 12000,
            "volume": 8.0
        },
        "output": {
            "rows": 12000,
            "volume": 8.0
        },
        "cost": 0.0
    }
},
{
    "order_id": 3,
    "time": {
        "deployment": 10.0,
        "execution": 1200.0,
        "removal": 6.0,
        "cost": 0.0
    },
    "data": {
        "input": {
            "rows": 12000,
            "volume": 8.0
        },
        "output": {
            "rows": 12000,
            "volume": 8.0
        },
        "cost": 0.0
    }
},
```

FIG. 10C

```
{
    "order_id": 4,
    "time": {
        "deployment": 30.0,
        "execution": 100.0,
        "removal": 20.0,
        "cost": 0.0
    },
    "data": {
        "input": {
            "rows": 12000,
            "volume": 12.0
        },
        "output": {
            "rows": 12000,
            "volume": 8.0
        },
        "cost": 12.0
    }
},
{
    "order_id": 5,
    "time": {
        "deployment": 100.0,
        "execution": 1200.0,
        "removal": 30.0,
        "cost": 13.3
    },
    "data": {
        "input": {
            "rows": 28000,
            "volume": 16.8
        },
        "cost": 2.8
    }
}
],
```

FIG. 10D

```
"execution_result": {
    "total_cost": 43.9,
    "execution_cost": 26.7,
    "data_cost": 17.2,
    "deploy_time": 240.0,
    "execution_time": 1200.0,
    "removal_time": 96.0,
    "start_date": "2023-03-31 12:10:23",
    "end_date": "2023-03-31 12:36:37"
  }
}
```

COMPUTER SYSTEM AND SERVICE CONSTRUCTION SUPPORT METHOD

CLAIM OF PRIORITY

The present application claims priority from Japanese patent application JP 2023-135707 filed on Aug. 23, 2023, the content of which is hereby incorporated by reference into this application.

BACKGROUND OF THE INVENTION

1. Field of the Invention

The present invention relates to a technology for constructing a service which utilizes data.

2. Description of the Related Art

Data analysis and data linking have become important with development of digital transformation. For example, a technology described in JP-2022-167673-A is known as a technology utilizing data.

JP-2022-167673-A includes the following description. An information processing device 101 acquires assignment data indicating an assignment result of a plurality of resources assigned to a plurality of assignees. The information processing device 101 extracts data violating a first condition from the acquired assignment data. The information processing device 101 classifies the extracted data into a plurality of groups in accordance with predetermined criteria. The information processing device 101 calculates index values each indicating an appearance frequency of an assignment pattern of the corresponding resource included in the plurality of resources, on the basis of the respective data of the plurality of classified groups. The information processing device 101 generates a second condition associated with the allocation patterns of the resources, on the basis of the calculated index values.

For utilizing data, knowledge associated with data and applications and sufficient for data utilization is required. Accordingly, even if data is provided, there remains such a problem that sufficient knowledge of a method for utilizing the data is not known.

An object of the present invention is to provide a system and a method for supporting construction of a service which utilizes data.

SUMMARY OF THE INVENTION

The following example is one typical example of the invention disclosed in the present application. Specifically, an aspect of the present invention is directed to a computer system connecting with a base that provides a service including a plurality of components. The computer system performs retaining component management information for managing schemas associated with the components included in the service, at the time of reception of a retrieval request for retrieving the components to achieve a service using a target component, retrieving associated components having the same schema as the target component with reference to the component management information, while designating the schema of the target component as a starting point, and presenting the associated components.

According to the present invention, construction of a service which utilizes data is supportable. Problems, configurations, and effects other than those described above will become apparent in light of a description of the embodiment presented below.

BRIEF DESCRIPTION OF THE DRAWINGS

FIG. 3A is a diagram illustrating an example of a data structure of component management information according to Embodiment 1;

FIG. 3B is a diagram illustrating an example of the data structure of the component management information according to Embodiment 1;

FIG. 3C is a diagram illustrating an example of the data structure of the component management information according to Embodiment 1;

FIG. 3D is a diagram illustrating an example of the data structure of the component management information according to Embodiment 1;

FIG. 7 is a flowchart for explaining an example of a service setting information generation process executed by the schema hub according to Embodiment 1;

FIG. 8A is a diagram illustrating an example of a data structure of service setting information according to Embodiment 1;

FIG. 8B is a diagram illustrating an example of the data structure of service setting information according to Embodiment 1;

FIG. 8C is a diagram illustrating an example of the data structure of the service setting information according to Embodiment 1;

FIG. 8D is a diagram illustrating an example of the data structure of the service setting information according to Embodiment 1;

FIG. 8E is a diagram illustrating an example of the data structure of the service setting information according to Embodiment 1;

FIG. 8F is a diagram illustrating an example of the data structure of the service setting information according to Embodiment 1;

FIG. 8G is a diagram illustrating an example of the data structure of the service setting information according to Embodiment 1;

FIG. 8H is a diagram illustrating an example of the data structure of the service setting information according to Embodiment 1;

FIG. 10A is a diagram illustrating an example of the data structure of the service setting information according to Embodiment 1;

FIG. 10B is a diagram illustrating an example of the data structure of the service setting information according to Embodiment 1;

FIG. 10C is a diagram illustrating an example of the data structure of the service setting information according to Embodiment 1; and FIG. 10D is a diagram illustrating an example of the data structure of the service setting information according to Embodiment 1.

DESCRIPTION OF THE PREFERRED EMBODIMENT

Figure 1:
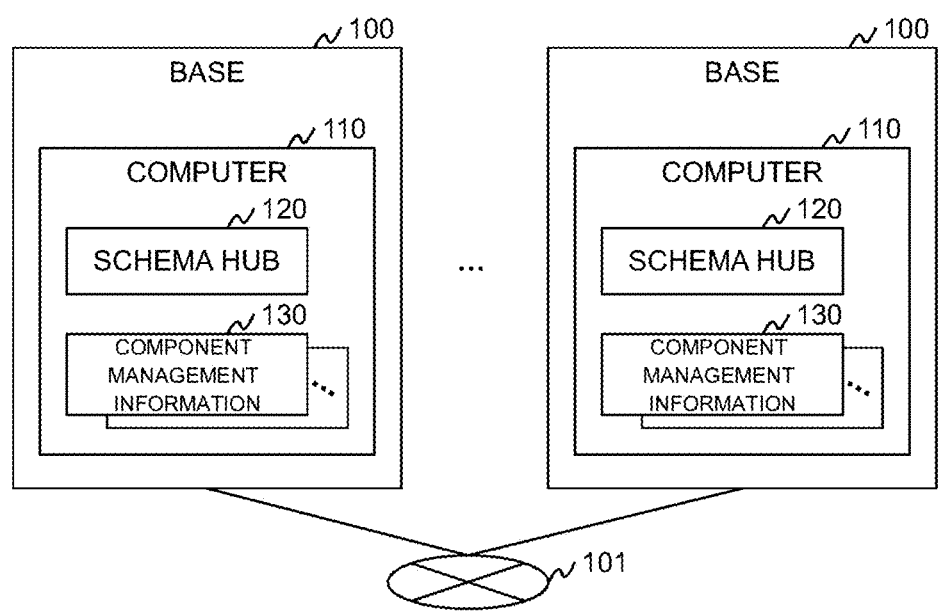
FIG. 1 is a block diagram illustrating an example of a configuration of a computer system according to Embodiment 1.

An embodiment according to the present invention will hereinafter be described with reference to the drawings. It is not intended, however, that the present invention be interpreted as an invention limited to the contents of the description of the embodiment presented below. It is easily understood by those skilled in the art that specific configurations of the present invention can be modified without departing from the idea and the spirit of the present invention.

In the configurations of the invention described below, identical or similar configurations or functions will be given identical reference signs, and the same explanation will not be repeated.

Such expressions as "first," "second," and "third" in the present specification and others are given only for the purpose of identification of constituent elements, and hence are not necessarily presented as indications for limiting numbers or orders of the constituent elements.

Some positions, sizes, shapes, ranges, and the like of respective configurations illustrated in the drawings and others may not indicate actual positions, sizes, shapes, ranges, and the like for easy understanding of the invention. Accordingly, the positions, sizes, ranges, and the like of the present invention are not limited to those disclosed in the drawings and others.

Embodiment 1

FIG. 1 is a block diagram illustrating an example of a configuration of a computer system according to Embodiment 1.

The computer system includes a plurality of bases 100. The bases 100 are connected to each other via a network 101 such as a wide area network (WAN) and a local area network (LAN).

Each of the bases 100 provides a resource for achieving a service which utilizes data. Each of the bases 100 includes a computer, a switch, a storage device, and the like for providing the resource. The service includes such components as data, a database, data processing, and an application.

According to Embodiment 1, each of the bases 100 includes a computer 110 having a schema hub 120. The schema hub 120 manages component management information 130 for managing schemas associated with the components constituting the service of the base 100.

Figure 2:
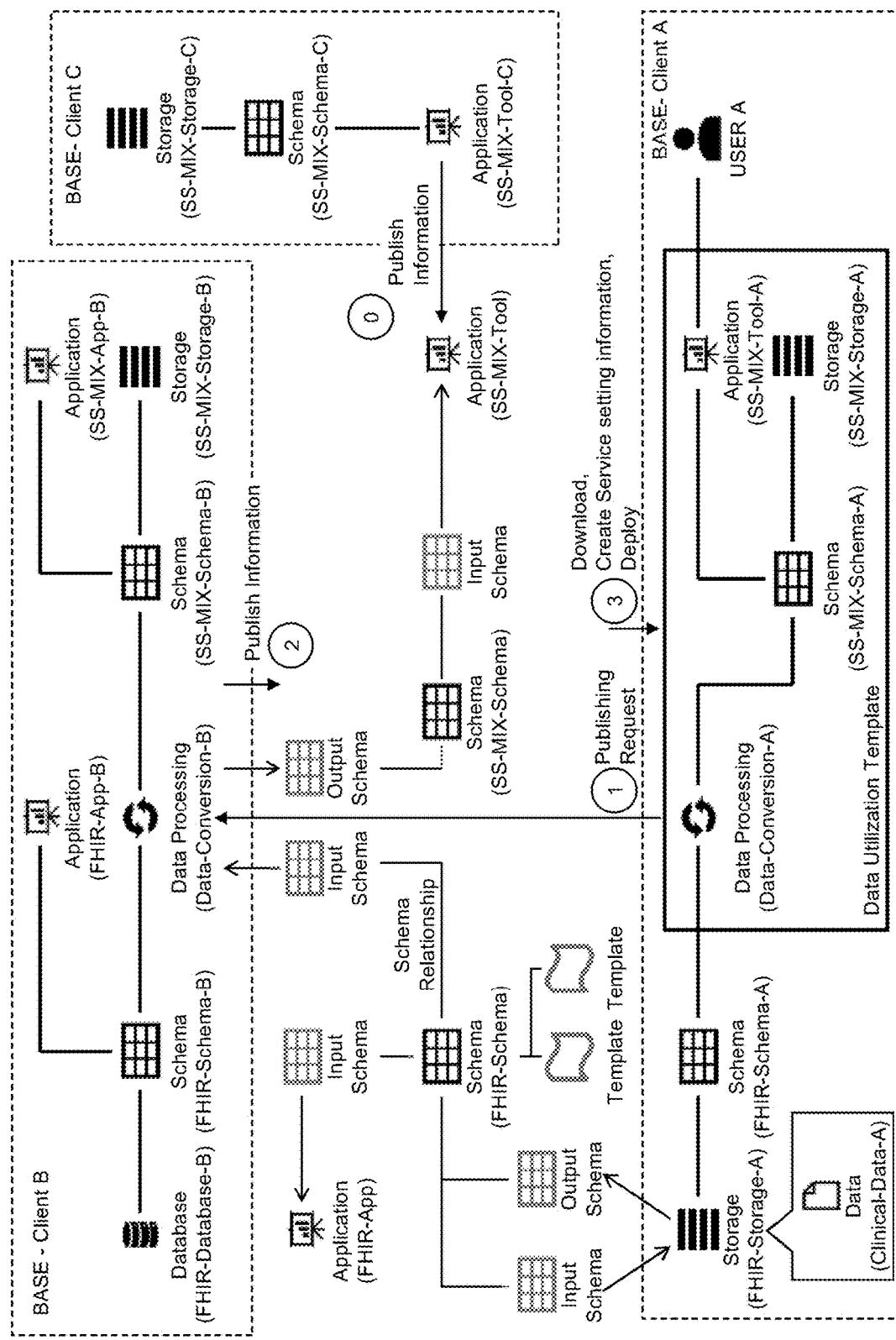
FIG. 2 is a diagram illustrating an example of a use case of the computer system according to Embodiment 1.

FIG. 2 is a diagram illustrating an example of a use case of the computer system according to Embodiment 1.

FIG. 2 illustrates the bases 100 used by a client A, a client B, and a client C. It is assumed that the base 100 of the client B executes a data conversion service including a data conversion process (Data-Conversion-B) and that the base 100 of the client C executes a data analysis service using an analysis application (SS-MIX-Tool-C). For the data conversion service, information associated with a schema of the data conversion process is published, but setting information for implementing the data conversion process is not published. For the analysis application, both a schema and setting information for implementing the analysis application are published. It is further assumed that the analysis application (FHIR-App) is provided as an open source. In this case, it is assumed that information associated with a schema of the component provided as the open source is set for the schema hub 120 beforehand.

The base 100 of the client A retains a storage (FHIR-Storage-A). A user of the client A registers information associated with a schema of this storage in the schema hub 120, and transmits a retrieval request for retrieving components. The schema hub 120 retrieves components having the same schema as the storage, while designating this schema as a starting point.

An input/output schema of the storage is FHIR-Schema. Each of a schema of a database as input to the data conversion process (Data-Conversion-B) and a schema of data as input to the analysis application (FHIR-App) is the same as the input/output schema of the storage. Accordingly, the data conversion process (Data-Conversion-B) and the analysis application (FHIR-App) are retrieved as components for which the same schema as the schema of the storage is defined.

Moreover, a schema of a storage as output from the data conversion process (Data-Conversion-B) is SS-MIX-Schema, and is the same as a schema of data handled by the analysis application (SS-MIX-Tool-C). Accordingly, the analysis application (SS-MIX-Tool-C) is retrieved as a component for which the same schema as the schema of the data conversion process (Data-Conversion-B) is defined.

The user selects components to be used from the retrieved components. For a component not published, a use application for using this component is transmitted to an owner of this component. The owner publishes information associated with this component as necessary. The schema hub 120 acquires the information associated with the published component. The schema hub 120 generates service setting information 800 for constructing a service which uses the selected components, and deploys the components on the base 100 in reference to the service setting information 800.

Each of FIGS. 3A, 3B, 3C, 3D, and 3E is a diagram illustrating an example of a data structure of the component management information 130 according to Embodiment 1.

Figures 3E, 4:
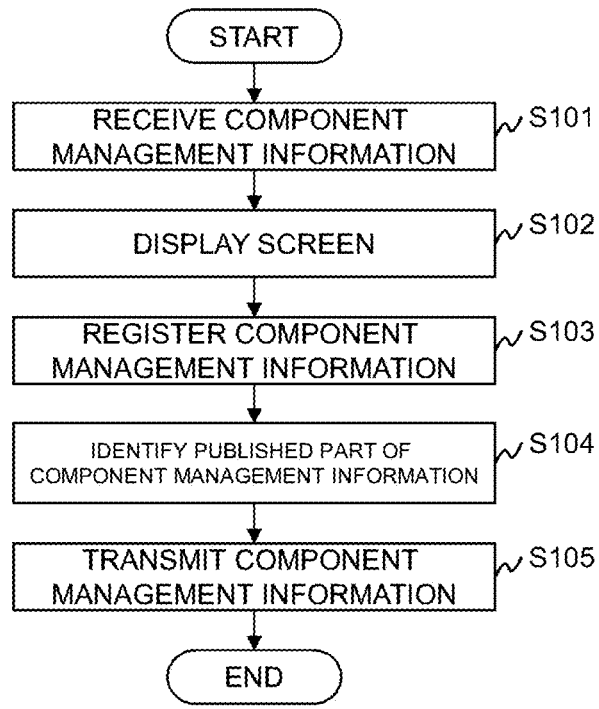
FIG. 3E is a diagram illustrating an example of the data structure of the component management information according to Embodiment 1.
FIG. 4 is a flowchart for explaining an example of a component management information registration process executed by a schema hub according to Embodiment 1.

The component management information 130 is information indicating a data structure illustrated in FIG. 3A. Components constituting a service are managed for each unit of a "project." Information illustrated in each of FIGS. 3B to 3E is contained in a part "component" in the component management information 130.

Information associated with a template for constituting a component, such as a template of Infrastructure as Code (IaC), is contained in the information illustrated in FIG. 3B. Information associated with a schema is described in the information illustrated in each of FIGS. 3C, 3D, and 3E. Information associated with a template for constituting a schema, such as Data Definition Language (DDL), is similarly contained in this information.

Information indicating a supply status of the service using the component is contained in "service." For example, this is information indicating an operation condition, a publication range of the information, limitation of input/output, connection of the component, and the like. Meanwhile, "target_id" is information indicating connection with the component.

A schema illustrated in FIG. 3D represents a schema of data to be input to the storage, while a schema in FIG. 3E represents a schema of data to be output from the storage. As described above, a schema can be individually set for each of data input and data output to and from the component.

FIG. 4 is a flowchart for explaining an example of a component management information registration process executed by the schema hub 120 according to Embodiment 1.

The user generates the component management information 130, and transmits a registration request to the schema hub 120.

The schema hub 120 receives the component management information 130 contained in the registration request (step S101).

The schema hub 120 displays a screen indicating a correlation between a component and a schema, on the basis of the component management information 130 (step S102). The user checks the screen, and corrects the component management information 130 as necessary.

When receiving the registration instruction from the user, the schema hub 120 registers the component management information 130 (step S103).

The schema hub 120 identifies a published part of the component management information 130 (step S104). According to the present embodiment, a component and a schema each indicating "public" in "release" of "service" correspond to publication targets. However, these are not published if "release" of "service" is "private."

The schema hub 120 transmits the component management information 130 containing only information corresponding to the published part to a different schema hub 120 (step S105).

When receiving the component management information 130 from the different schema hub 120, the schema hub 120 registers the received component management information 130.

Figure 5:
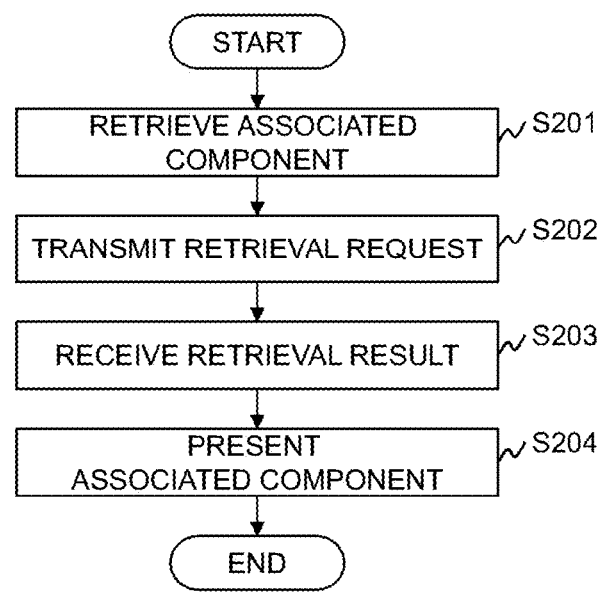
FIG. 5 is a flowchart for explaining an example of a component retrieval process executed by the schema hub according to Embodiment 1.

FIG. 5 is a flowchart for explaining an example of a component retrieval process executed by the schema hub 120 according to Embodiment 1.

The user inputs information associated with a component corresponding to a starting point of retrieval, and transmits a retrieval request to the schema hub 120. Possible items of the information associated with the component include information associated with the base 100 containing the component, a component type, a component name, and the like.

The schema hub 120 retrieves a component (associated component) for which the same schema as the schema of the component corresponding to the starting point is defined, on the basis of this schema (step S201). Specifically, the following processing is executed.

(S201-1) The schema hub 120 acquires the component management information 130 associated with the component corresponding to the starting point. The schema hub 120 compares schema information contained in the acquired component management information 130 with schema information contained in the component management information 130 associated with a different component, to retrieve a component for which the same schema is defined. The same schema here refers to a schema including identical "schema_name." Note that this determination criterion is presented as an example and not by way of limitation. For example, the determination may be made on the basis of "template_name."

(S201-2) The schema hub 120 retrieves an associated component, while designating the retrieved component as a starting point. This retrieval is achieved in the same manner as the manner described above.

The schema hub 120 repetitively executes the processing in S201-2. When a plurality of schemas are defined for the same component, the foregoing process is executed for each of these schemas.

When the schema hub 120 having received the retrieval request does not have the component management information 130 associated with the designated component, the schema hub 120 forwards the retrieval request to a different schema hub 120.

The schema hub 120 transmits to the different schema hub 120 a retrieval request including the component management information 130 associated with the component corresponding to the starting point and the associated component (step S202). There may be such a component for which the component management information 130 is not published. Hence, the retrieval request is transmitted to the different schema hub 120.

The schema hub 120 having received this retrieval request retrieves an associated component with reference to the component management information 130 retained by the schema hub 120 having received this request, and gives a response indicating the retrieved associated component.

The schema hub 120 receives a retrieval result from the different schema hub 120 to which the retrieval request has been transmitted (step S203).

The schema hub 120 presents the associated component (step S204). For example, the schema hub 120 generates a graph indicating a connection relation between the component corresponding to the starting point and the associated component, and displays this graph on the screen.

Note that the schema hub 120 may determine whether or not to continue retrieval, on the basis of the retrieval result.

Figure 6:
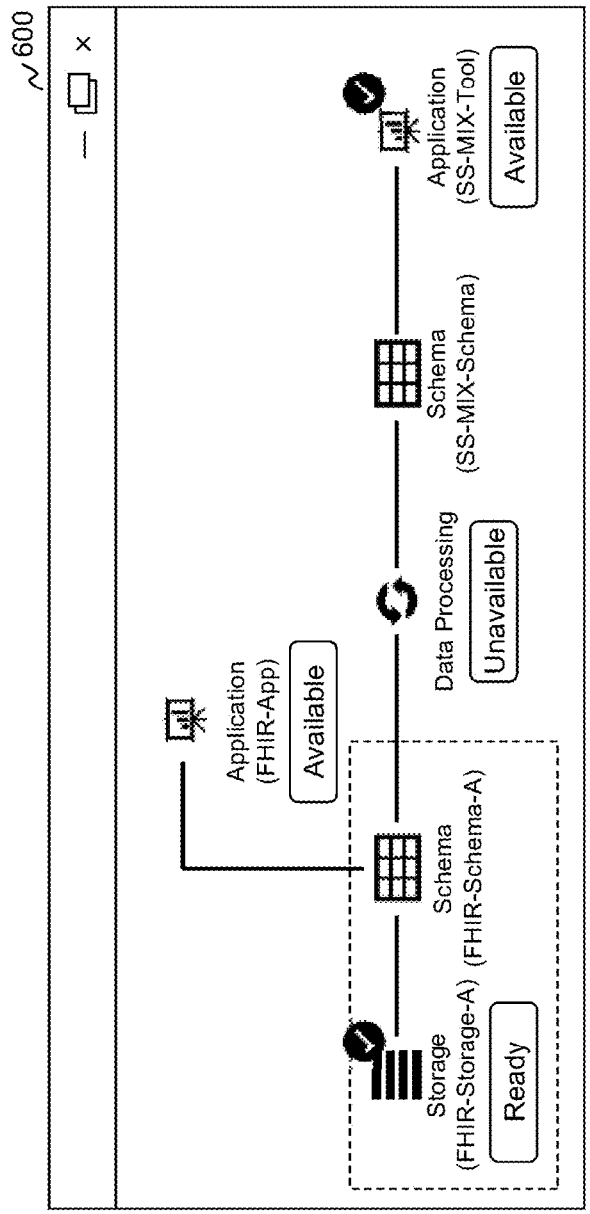
FIG. 6 is a diagram illustrating an example of a screen displayed by the schema hub according to Embodiment 1.

FIG. 6 is a diagram illustrating an example of a screen displayed by the schema hub 120 according to Embodiment 1.

The schema hub 120 displays a screen 600 illustrated in FIG. 6. A portion indicated by a dotted line represents a component corresponding to a starting point and a schema of this component.

As illustrated in FIG. 2, an analysis tool (FHIR-App) and the data conversion process (Data-Conversion-B) are retrieved as components for which the same schema as the schema of the storage (FHIR-Storage-A) is defined. Moreover, the analysis application (SS-MIX-Tool) is retrieved as a component for which the same schema as the schema of the data conversion process (Data-Conversion-B) is defined. Accordingly, the components illustrated in FIG. 6 are displayed as components associated with the storage (FHIR-Storage-A).

Information indicating a state of usability of the component is displayed in the vicinity of each icon representing the component. In this information, "Ready" indicates that the component is ready for use, "Available" indicates that the component is settable in response to a request, and "Unavailable" indicates that the component is not settable due to the presence of unpublished information.

The user selects components desired to be used. In FIG. 6, the storage (FHIR-Storage-A) and the analysis application (SS-MIX-Tool) are selected.

FIG. 7 is a flowchart for explaining an example of a service setting information generation process executed by the schema hub 120 according to Embodiment 1.

The schema hub 120 receives a generation request including information associated with components desired to be used (step S301).

The schema hub 120 identifies components necessary for achieving a service which uses designated components, on the basis of a result of retrieval of associated components (step S302). It is assumed that the components are identified here such that the number of components for constituting the service is minimum.

When an additional component for enabling use of the designated components is required, the schema hub 120 adds a new component. According to the example illustrated in FIG. 6, a component for managing data corresponding to the schema (SS-MIX-Schema) is required. Accordingly, a component corresponding to a storage is added.

The schema hub 120 generates service setting information 800 for setting the components constituting the service (step S303).

According to the present embodiment, a template for the service setting information is prepared beforehand. The schema hub 120 enters information contained in the component management information 130 associated with the components into this template to generate the service setting information.

The schema hub 120 displays a screen for editing the service setting information 800 (step S304).

The schema hub 120 stores the service setting information 800 edited through the screen (step S305).

A data structure of the service setting information 800 will be explained here. Each of FIGS. 8A, 8B, 8C, 8D, 8E, 8F, 8G, and 8H is a diagram illustrating an example of the data structure of the service setting information 800 according to Embodiment 1.

As illustrated in FIG. 8A, the service setting includes meta information, as well as information 800 execution_request, execution_plan, execution_service, execution_history, execution_result, and application_request.

As illustrated in FIG. 8B, various types of information for deploying the components are contained in execution_request.

As illustrated in FIGS. 8C, 8D, 8E, and 8F, setting information associated with the components constituting the service is contained in execution_plan. A lifetime of each component may be set for execution_plan.

As illustrated in FIG. 8G, information associated with the component currently operating for the service is contained in execution_service. Information to be contained in execution_service is determined at the time of operation of the service.

An execution history of each component for the service is contained in execution_history. An operation result of the service is contained in execution_result.

As illustrated in FIG. 8H, information associated with a use application for using a component is contained in application_request.

Figure 9A:
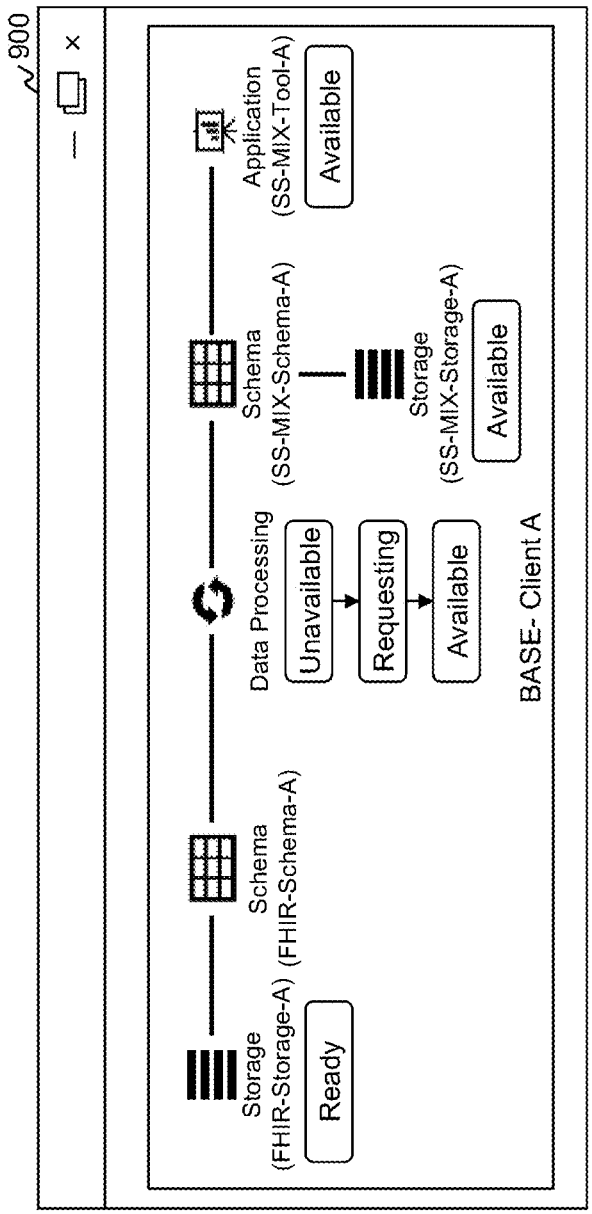
FIG. 9A is a diagram illustrating an example of a screen displayed by the schema hub according to Embodiment 1.
Figure 9B:
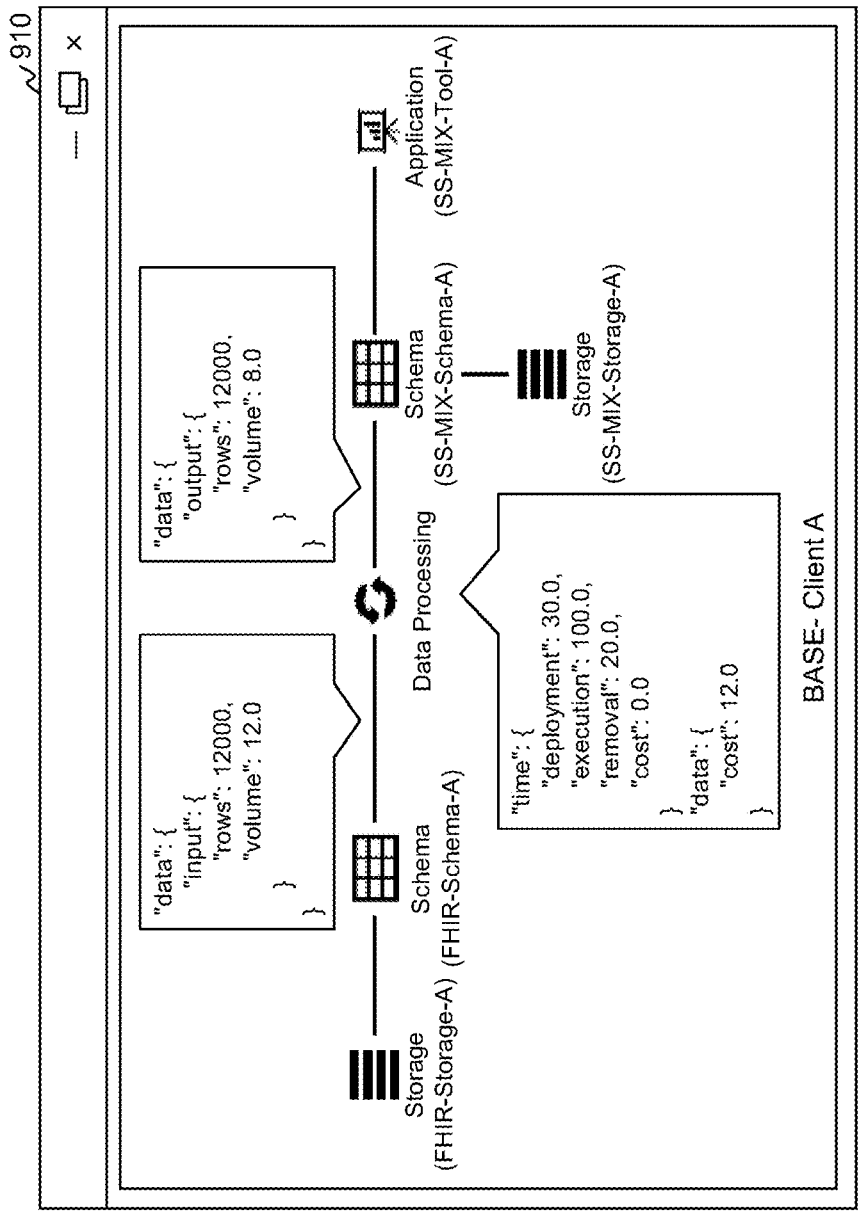
FIG. 9B is a diagram illustrating an example of the screen displayed by the schema hub according to Embodiment 1.

Each of FIGS. 9A and 9B is a diagram illustrating an example of a screen displayed by the schema hub 120 according to Embodiment 1.

The user adds and deletes components, and also edits the base 100 where components are to be disposed, each being achieved via a screen 900. Moreover, the user issues a use application for using a component, which is in the state of "Unavailable," to an owner of this component via the screen 900 to set this component. For example, the user issues the use application by clicking the component. Alternatively, an operation button for issuing the use application may be provided in the screen 900. At this time, the state of usability of the component is updated to "Requesting." When receiving the component management information 130 for using the component, the schema hub 120 updates the service setting information 800, and also updates the state of usability of the component to "Available."

The user selects the service setting information 800 to be used, via the screen 900, and transmits a deploy instruction. The schema hub 120 deploys the components on the base 100 in accordance with the service setting information 800. According to the present embodiment, the components are deployed in an order of order id. After completion of deployment, the state of usability of each of the components is updated to "Ready" from "Available." For deploying the components on the different bases 100, the schema hub 120 issues the deploy instruction to the schema hubs 120 of the respective bases 100.

The user selects the service setting information 800 associated with a service to be started, via the screen 900, and transmits a start instruction for starting this service. According to the present embodiment, processes using the components are executed in an order of order_id. The schema hub 120 acquires execution histories of the components, and stores the execution histories in the service setting information 800. When the components are present on the different bases 100, the schema hub 120 acquires the execution histories of these components via each of the schema hubs 120 of the bases 100.

Each of FIGS. 10A, 10B, 10C, and 10D is a diagram illustrating an example of the data structure of the service setting information 800 according to Embodiment 1.

Histories illustrated in each of FIGS. 10A, 10B, and 10C are contained in execution_history. Moreover, an operation result illustrated in FIG. 10D is stored in execution_result. Note that the operation result may be generated on the basis of the execution histories of the components.

The user selects the service setting information 800 associated with a service to be ended, via the screen 900, and transmits an end instruction for ending this service. In this case, the schema hub 120 deletes the components deployed in accordance with the service setting information 800. The schema hub 120 displays the execution histories of the components and the operation result of the service stored in the service setting information 800, in response to a request. For example, the schema hub 120 displays a screen 910 to present the histories. The user checks the execution histories of the components and the operation result of the service via the screen 910.

According to Embodiment 1, the schema hub 120 is capable of retrieving components necessary for achieving a service which utilizes components managed by the user, and presenting the retrieved components. Moreover, the schema hub 120 is capable of automatically generating information for constructing a service constituted by components designated by the user, and is capable of providing various settings for achieving the service with use of the generated information. Accordingly, the schema hub 120 is capable of supporting construction of a service which utilizes data.

According to the present embodiment, the computer 110 including the schema hub 120 is provided in each of the bases 100. However, this configuration is not required to be adopted. The schema hub 120 may be included in a management system connecting to the respective bases 100. In this case, the management system centrally manages the component management information 130 associated with components of each of the bases 100.

Note that the present invention is not limited to the embodiment described above, and may include various modifications. Moreover, for example, the configurations of the embodiment have been described above in detail to help easy understanding of the present invention, and hence, all the configurations described above are not necessarily required. Further, some of the configurations of the embodiment may be added to, deleted from, or replaced with other configurations.

In addition, some or all of the respective configurations, functions, processing units, processing means, and the like described above may be designed using integrated circuits, for example, to implement these configurations and the like by hardware. Besides, the present invention may be practiced using program codes of software implementing the functions of the embodiment. In this case, a storage medium storing records of the program codes is provided for a computer, and a processor included in this computer reads the program codes stored in the storage medium. In this case, the program codes read from the storage medium achieve the functions of the embodiment described above, and hence, the program codes and the storage medium storing the program codes constitute the present invention. For example, the storage medium for supplying these program codes is a flexible disk, a compact disk-read only memory (CD-ROM), a digital versatile disc-ROM (DVD-ROM), a hard disk, a solid state drive (SSD), an optical disk, a magneto-optical disk, a CD-recordable (R), a magnetic tape, a non-volatile memory card, a ROM, or the like.

Moreover, for example, the program codes achieving the functions described in the present embodiment may be implemented by use of a program or a script language in a wide range, such as an assembler, C/C++, Perl, Shell, PHP, Python, and Java (registered trademark).

Further, the program codes of the software achieving the functions of the embodiment may be distributed via a network to store the program codes in storage means of a computer, such as a hard disk and a memory, or a storage medium such as a CD-ReWritable (RW) and a CD-R. In this case, a processor included in the computer may read and execute the program codes stored in the storage means or the storage medium.

According to the embodiment described above, only control lines and information lines necessary for the explanation are presented, and hence, all control lines and information lines included in products are not necessarily indicated. All configurations may be connected to each other.

What is claimed is:

1. A computer system connecting with a base that provides a service including a plurality of components, the computer system comprises a non-transitory computer storage medium storing programming codes when executed by a processor, perform:
    retaining component management information for managing schemas associated with the components included in the service;
    at a time of reception of a retrieval request for retrieving the components to achieve a service using a target component, retrieving associated components having a same schema as the target component with reference to the component management information, while designating the schema of the target component as a starting point; and
    presenting the associated components,
    wherein
    the component management information includes setting information for setting the components, and
    the computer system performs
    receiving desired designation of the associated components to use,
    generating a graph for connecting the target component and the designated associated components, on a basis of a result of the retrieval, and
    generating service setting information for setting the target component and the associated components included in the graph, on a basis of the setting information contained in the component management information indicating the associated components included in the graph, and outputting the generated service setting information.

2. The computer system according to claim 1, wherein
    the component management information includes data indicating whether or not to allow publication to unspecified users, and,
    in a case where the associated components included in the graph include a corresponding one of the associated components that is associated with the component management information for which the data indicating non-publication is set, a use application for using the corresponding associated component is transmitted to an owner of the corresponding associated component.

3. The computer system according to claim 1, wherein execution histories of the components of the service constructed with reference to the service setting information are recorded.

4. The computer system according to claim 1, wherein the service setting information includes a lifetime of each of the associated components included in the graph.

5. The computer system according to claim 1, wherein an interface for designating the associated components to be used is provided.

6. A service construction support method executed by a computer system,
    the computer system comprises a non-transitory computer storage medium storing programming codes when executed by a processor, perform:
    connecting with a base that provides a service including a plurality of components, and
    retaining component management information for managing schemas associated with the components included in the service, the service construction support method comprising:
    a first step of causing the computer system to perform, at a time of reception of a retrieval request for retrieving the components to achieve a service using a target component, retrieving associated components having a same schema as the target component with reference to the component management information, while designating the schema of the target component as a starting point; and
    a second step of causing the computer system to present the associated components,
    wherein
    the component management information includes setting information for setting the components, and
    the service construction support method further includes
    a third step of causing the computer system to receive desired designation of the associated components to use,
    a fourth step of causing the computer system to generate a graph for connecting the target component and the designated associated components, on a basis of a result of the retrieval, and a fifth step of causing the computer system to generate service setting information for setting the target component and the associated components included in the graph, on a basis of the setting information contained in the component management information indicating the associated components included in the graph, and output the generated service setting information.

7. The service construction support method according to claim 6, wherein
the component management information includes data indicating whether or not to allow publication to unspecified users, and,
in a case where the associated components included in the graph include a corresponding one of the associated components that is associated with the component management information for which the data indicating non-publication is set, the fifth step causes the computer system to transmit a use application for using the corresponding associated component to an owner of the corresponding associated component.

8. The service construction support method according to claim 6, further comprising:
a step of causing the computer system to record execution histories of the components of the service constructed with reference to the service setting information.

9. The service construction support method according to claim 6, wherein the service setting information includes a lifetime of each of the associated components included in the graph.

10. The service construction support method according to claim 6, further comprising:
a step of causing the computer system to provide an interface for designating the associated components to be used.

* * * * *